May 12, 1942.                R. D. JONES                2,282,966
                        DYNAMO-ELECTRIC MACHINE
                          Filed Dec. 31, 1940
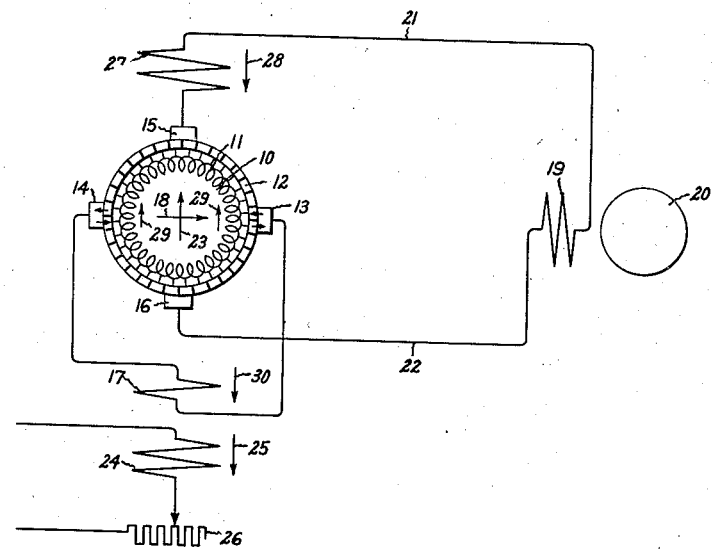
Inventor:
Ray D. Jones,
by Harry E. Dunham
His Attorney.

Patented May 12, 1942

2,282,966

UNITED STATES PATENT OFFICE 2,282,966

DYNAMOELECTRIC MACHINE

Ray D. Jones, Fort Wayne, Ind., assignor to General Electric Company, a corporation of New York Application December 31, 1940, Serial No. 372,460

9 Claims. (Cl. 171—223)

This invention relates to direct-current commutator type dynamo-electric machines wherein the armature reaction of the machine provides a source of excitation thereto.

A direct-current machine of the armature reaction excitation type is a dynamo-electric machine which may be operated as a motor, a generator, or a rotary transformer, and is provided with a rotor or armature having a winding formed of coils connected to a commutator of the conventional direct-current dynamo-electric machine type. The stationary member of such a machine usually is arranged to provide a path of low magnetic reluctance to the magnetic flux set up by the armature currents and may be provided with various windings to improve or control the operation of the machine. The basic principle of operation of my machine is similar to that of the Rosenberg generator in that it depends upon armature reaction flux produced by current flowing between two sets of brushes for providing the desired characteristics of the machine. The Rosenberg type direct-current generator is characterized by its constant output current characteristic. By providing special field exciting windings on the stationary member of the machine, this type dynamo-electric machine may be made to provide a controllable variable voltage and variable current characteristic with a very high rate of response and high amplification ratio. These features are of particular importance when such a machine is used to control other electrical apparatus, as in regulator and exciter systems. In order to obtain this high amplification ratio and low time constant, the stationary member of the machine is provided with a main control field exciting winding having a very low number of turns in order to reduce its inductance, and another field exciting winding is arranged to neutralize or compensate for the normal armature reaction produced by the load or secondary current of the machine. I have found that the coils of the armature winding which are short circuited by the brushes along the primary axis of the machine produce a component of excitation along the secondary axis of the machine which is opposed to the component of excitation provided to the machine by the control field exciting winding, so that a considerable portion of the excitation produced by the control field exciting winding is used in overcoming this short circuited coil current excitation.

An object of my invention is to provide a dynamo-electric machine having high amplification and quick response characteristics.

Another object of my invention is to provide for the compensation of excitation due to current in the short circuited coils undergoing commutation in a dynamo-electric machine of the armature reaction excitation type.

Further objects and advantages of my invention will become apparent and my invention will be better understood from the following description referring to the accompanying drawing, and the features of novelty which characterize my invention will be pointed out with particularity in the claims annexed to and forming part of this specification.

The figure of the drawing is a diagrammatic illustration of an electrical system including a dynamo-electric machine embodying my improved field exciting winding arrangement.

Referring to the drawing, I have shown an armature reaction excited dynamo-electric machine arranged as an exciter generator provided with a rotatable member or armature 10 having a winding formed of coils 11 electrically connected to the segments of a commutator 12. This armature is of the conventional direct-current type and is adapted to be driven at substantially constant speed by any suitable source of mechanical power. In dynamo-electric machines of the armature reaction excited type, a set of primary brushes is arranged to provide a short circuit through the armatures. In the illustrated arrangement, a set of primary brushes 13 and 14 is arranged to provide a primary short circuit through the armature 10, and a set of secondary brushes 15 and 16 is arranged in contact with the commutator 12 and is electrically displaced therabout from the primary brushes 13 and 14 to provide a secondary circuit through the armature. In order to obtain a substantially balanced distribution of electric currents through the various parts of the armature, the secondary brushes 15 and 16 are displaced substantially 90 electrical degrees from the primary brushes 13 and 14. The primary circuit of the machine is completed by connecting the primary brushes 13 and 14 externally through a field exciting winding 17 of relatively few turns and low resistance. This circuit substantially short circuits these brushes so that a very small amount of flux is required to induce a voltage therebetween to build up a relatively large primary current through that part of the armature winding which is connected between these brushes. This primary current will produce a component of magnetic excitation or primary armature reaction along the primary commutating axis of the machine as indicated by the arrow 18. As the armature rotates, the conductors which are connected between the secondary brushes 15 and 16 will cut the primary armature reaction flux and a voltage will be induced between these brushes. If these brushes are connected to a load such as a field exciting winding 19 of a dynamo-electric machine 20 by conductors 21 and 22, a secondary or load current will flow through the secondary circuit of the armature and produce a secondary armature reaction along the commutating axis of these brushes, as indicated by the arrow 23.

In order to control the secondary or load characteristics of the generator, a field exciting winding 24 is arranged to provide a component of magnetic excitation along the secondary commutating axis of the machine as indicated by the arrow 25. The excitation which is provided by the field exciting winding 24 induces an electromotive force in the armature winding between the primary brushes 13 and 14, and any suitable means, such as a variable resistor 26 connected in series with the winding 24, may be arranged to vary the energization of this winding so as to control the excitation thereof. As explained above, a flow of current through the armature primary circuit produces a primary armature reaction, indicated by the arrow 18, which induces a voltage between the secondary brushes 15 and 16 when the armature rotates. This produces a secondary or load current which results in a secondary armature reaction which opposes the excitation of the control field exciting winding 24, as indicated by the arrows 23 and 25, respectively. The sensitivity of this control field exciting winding 24 can be increased by reducing the net effect of secondary armature reaction by providing a field exciting winding 27 arranged to provide a component of magnetic excitation 28 along the secondary commutating axis of the machine in opposition to the secondary armature reaction 23, as indicated by the arrows in the drawing. The excitation provided by this field exciting winding is arranged substantially to neutralize the magnetic back coupling of electric current in the secondary circuit of the armature with the primary circuit by substantially neutralizing the armature reaction flux along the secondary axis. This field exciting winding 27 is adapted substantially to neutralize the armature reaction 23 under all load conditions, and this compensation is made proportional to the secondary or load current in the armature by connecting the field exciting winding 27 directly in series with the secondary brush 15. With this secondary armature reaction compensating arrangement, the control field exciting winding 24 is only required to supply a relatively small excitation, thereby increasing its speed of response and sensitivity of control.

The primary brushes 13 and 14 are constructed and arranged to extend over a plurality of commutator segments, thereby each short circuiting a coil on the rotatable member winding. The current which flows through such short circuited coils produces a component of magnetic excitation along the secondary commutating axis of the machine, as indicated by the arrows 29, in opposition to the excitation provided by the control field exciting winding 24. In order further to reduce the size of the control field exciting winding and further to increase its speed of response and amplification factor, the field exciting winding 17 is connected directly in series with the primary short circuiting brushes 13 and 14 and is arranged to provide a component of magnetic excitation 30 responsive to the current in the rotatable member primary circuit and substantially equal and in the opposite direction to the excitation produced by the short circuit current in the coils of the armature winding which are short circuited by the primary brushes 13 and 14 so as to neutralize substantially the short circuit coil current component of excitation 29. I have found that by providing this field exciting winding, it is possible to reduce greatly the total field exciting windings necessary on the machine and to provide a much higher amplification factor for the overall operation of the machine.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamo-electric machine including a stationary member and a rotatable member having a plurality of coils and being provided with a commutator having segments connected to said coils, a set of primary brushes and a set of secondary brushes electrically displaced from said primary brushes adapted to provide a primary circuit and a secondary circuit respectively through said rotatable member, each of said primary brushes being constructed and arranged to extend over a plurality of commutator segments thereby short circuiting a coil of said rotatable member and producing a component of magnetic excitation by current in said short circuited coil, and means for substantially neutralizing said magnetic excitation produced by current in said short circuited coil.

2. A dynamo-electric machine including a stationary member and a rotatable member having a plurality of coils and being provided with a commutator having segments connected to said coils, a set of primary brushes and a set of secondary brushes electrically displaced from said primary brushes adapted to provide a primary circuit and a secondary circuit respectively through said rotatable member, each of said primary brushes being constructed and arranged to extend over a plurality of said commutator segments thereby short circuiting a coil of said rotatable member and producing a component of magnetic excitation along the secondary commutating axis of said rotatable member by current in said short circuited coil, and means including a field exciting winding arranged to provide a component of magnetic excitation for substantially neutralizing said component of excitation produced by current in said short circuited coil.

3. A dynamo-electric machine including a stationary member and a rotatable member having a plurality of coils and being provided with a commutator having segments connected to said coils, a set of primary brushes and a set of secondary brushes electrically displaced from said primary brushes adapted to provide a primary circuit and a secondary circuit respectively through said rotatable member, each of said primary brushes being constructed and arranged to extend over a plurality of commutator segments thereby short circuiting a coil of said rotatable member and producing a component of magnetic excitation along the secondary commutating axis of said rotatable member by current in said short circuited coil, and means including a field exciting winding arranged to provide a component of magnetic excitation responsive to current in said rotatable member primary circuit and in substantially the opposite direction and equal to said excitation produced by current in said short circuited coil for substantially neutralizing said short circuited coil current component of excitation.

4. A dynamo-electric machine including a stationary member and a rotatable member having a plurality of coils and being provided with a commutator having segments connected to said coils, a set of primary brushes and a set of secondary brushes electrically displaced from said primary brushes adapted to provide a primary circuit and a secondary circuit respectively through said rotatable member, means for controlling the secondary characteristics of said machine, means for substantially neutralizing mutual coupling of electric current in said rotatable member secondary circuit with said control means, each of said primary brushes being constructed and arranged to extend over a plurality of commutator segments thereby short circuiting a coil of said rotatable member and producing a component of magnetic excitation along the secondary commutating axis of said rotatable member by the short circuit current in said short circuited coil, and means for substantially neutralizing said magnetic excitation produced by current in said short circuited coil.

5. A dynamo-electric machine including a stationary member and a rotatable member having a plurality of coils and being provided with a commutator having segments connected to said coils, a set of primary brushes and a set of secondary brushes electrically displaced from said primary brushes adapted to provide a primary circuit and a secondary circuit respectively through said rotatable member, a field exciting winding arranged to provide a component of excitation responsive to electric current in said secondary circuit along substantially the same axis and in opposition to armature reaction excitation of electric current in said rotatable member secondary circuit, each of said primary brushes being constructed and arranged to extend over a plurality of commutator segments thereby short circuiting a coil of said rotatable member and producing a component of magnetic excitation along the secondary commutating axis of said rotatable member by current in said short circuited coil, and means for substantially neutralizing said excitation produced by current in said short circuited coil.

6. A dynamo-electric machine including a stationary member and a rotatable member having a plurality of coils and being provided with a commutator having segments connected to said coils, a set of primary brushes and a set of secondary brushes electrically displaced from said primary brushes adapted to provide a primary circuit and a secondary circuit respectively through said rotatable member, each of said primary brushes being constructed and arranged to extend over a plurality of said commutator segments thereby short circuiting a coil of said rotatable member and producing a component of magnetic excitation, means including a field exciting winding arranged to provide a component of magnetic excitation in substantially the opposite direction to said excitation produced by current in said short circuited coil for substantially neutralizing said short circuited coil current component of excitation, means for controlling the secondary characteristics of said machine, and means for substantially neutralizing mutual coupling of electric current in said rotatable member secondary circuit with said control means.

7. A dynamo-electric machine including a stationary member and a rotatable member having a plurality of coils and being provided with a commutator having segments connected to said coils, a set of primary brushes and a set of secondary brushes electrically displaced from said primary brushes adapted to provide a primary circuit and a secondary circuit respectively through said rotatable member, means for controlling the secondary characteristics of said machine, means for substantially neutralizing mutual coupling of electric current in said rotatable member secondary circuit with said controlling means, each of said primary brushes being constructed and arranged to extend over a plurality of commutator segments thereby short circuiting a coil of said rotatable member and producing a component of magnetic excitation along the secondary commutating axis of said rotatable member by current in said short circuited coil, and means including a field exciting winding arranged to provide a component of magnetic excitation responsive to current in said rotatable member primary circuit and in substantially the opposite direction and equal to said excitation produced by said short circuit current in said short circuited coil for substantially neutralizing said short circuited coil current component of excitation.

8. A dynamo-electric machine including a stationary member and a rotatable member having a plurality of coils and being provided with a commutator having segments connected to said coils, a set of primary brushes and a set of secondary brushes electrically displaced from said primary brushes adapted to provide a primary circuit and a secondary circuit respectively through said rotatable member, a field exciting winding arranged to provide a component of excitation responsive to electric current in said secondary circuit along substantially the same axis and in opposition to armature reaction excitation of electric current in said rotatable member secondary circuit, each of said primary brushes being constructed and arranged to extend over a plurality of said commutator segments thereby short circuiting a coil of said rotatable member and producing a component of magnetic excitation, means including a field exciting winding arranged to provide a component of magnetic excitation in substantially the opposite direction to said excitation produced by the current in said short circuited coil for substantially neutralizing said short circuited coil current component of excitation, and means for controlling the secondary characteristics of said machine.

9. A dynamo-electric machine including a stationary member and a rotatable member having a plurality of coils and being provided with a commutator having segments connected to said coils, a set of primary brushes and a set of secondary brushes electrically displaced from said primary brushes adapted to provide a primary circuit and a secondary circuit respectively through said rotatable member, a field exciting winding arranged to provide a component of excitation responsive to electric current in said secondary circuit along substantially the same axis and in opposition to armature reaction excitation of electric current in said rotatable member secondary circuit, each of said primary brushes being constructed and arranged to extend over a plurality of commutator segments thereby short circuiting a coil of said rotatable member and producing a component of magnetic excitation along the secondary commutating axis of said rotatable member by current in said short circuited coil, and means including a second field exciting winding arranged to provide a component of magnetic excitation responsive to current in said rotatable member primary circuit and in substantially the opposite direction and equal to said excitation produced by current in said short circuited coil for substantially neutralizing said short circuited coil current component of excitation.

RAY D. JONES.